(12) United States Patent
Hyeon et al.

(10) Patent No.: US 10,043,114 B2
(45) Date of Patent: Aug. 7, 2018

(54) ELECTRONIC DEVICE

(71) Applicant: Samsung Electronics Co., Ltd., Gyeonggi-do (KR)

(72) Inventors: Byeong-Bae Hyeon, Gyeonggi-do (KR); Choong-Hyun Nam, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 15/152,642

(22) Filed: May 12, 2016

(65) Prior Publication Data
US 2016/0334839 A1 Nov. 17, 2016

(30) Foreign Application Priority Data
May 12, 2015 (KR) .................. 10-2015-0066100

(51) Int. Cl.
| | | |
|---|---|---|
| *G06F 1/16* | (2006.01) | |
| *H05K 5/00* | (2006.01) | |
| *H05K 7/00* | (2006.01) | |
| *G06K 13/08* | (2006.01) | |
| *H04B 1/3818* | (2015.01) | |

(52) U.S. Cl.
CPC ....... *G06K 13/0831* (2013.01); *H04B 1/3818* (2015.01)

(58) Field of Classification Search
CPC . G06F 1/18; G06F 1/183; G06F 1/185; G06F 1/186; G06F 1/187; H04B 1/3818

USPC ............... 361/679.31, 679.32, 679.33; 455/575.1–575.9
See application file for complete search history.

(56) References Cited

U.S. PATENT DOCUMENTS

| | | | |
|---|---|---|---|
| 9,124,042 B2 * | 9/2015 | Matsunaga | H01R 13/74 |
| 9,484,655 B2 * | 11/2016 | Matsunaga | H01R 13/15 |
| 2014/0049920 A1 * | 2/2014 | Sloey | H04B 1/3816 |
| | | | 361/727 |
| 2014/0075074 A1 | 3/2014 | Lee | |
| 2014/0315404 A1 * | 10/2014 | Wang | G06K 13/08 |
| | | | 439/159 |
| 2014/0342601 A1 * | 11/2014 | Matsunaga | H01R 13/74 |
| | | | 439/527 |
| 2015/0011118 A1 * | 1/2015 | Matsunaga | H01R 13/15 |
| | | | 439/527 |

FOREIGN PATENT DOCUMENTS

JP 2014-170627 A 9/2014

* cited by examiner

*Primary Examiner* — Anthony Haughton
(74) *Attorney, Agent, or Firm* — Cha & Reiter, LLC.

(57) ABSTRACT

An electronic device may include: a socket; a tray detachably received in the socket; a receiving space formed in the tray; and a mounting section formed in the receiving space, wherein the receiving space is configured to receive a storage medium having one or more connection pads formed on a first side thereof, and the mounting section is configured disposed to face a second side of the storage medium when the storage medium is received with the receiving space, the first side being opposite to the second side.

7 Claims, 5 Drawing Sheets

ELECTRONIC DEVICE

CLAIM OF PRIORITY

This application claims the priority under 35 U.S.C. § 119(a) to Korean Application Ser. No. 10-2015-0066100, which was filed in the Korean Intellectual Property Office on May 12, 2015, the entire contents of which are hereby incorporated by reference.

TECHNICAL FIELD

The present disclosure generally relates to an electronic device and, more particularly, to an electronic device having a storage medium releasably coupled thereto.

BACKGROUND

Electronic devices refer not only to home appliances but also to devices that perform specific functions according to programs installed therein. Such functions may include, for example, electronic diaries, portable multimedia players, mobile communication terminals, tablet PCs, video/audio devices, desktop/laptop computers, navigation systems for vehicles, etc. For example, these electronic devices may output stored information as sounds or images. With the increase of the degree of integration and the popularization of hyper-speed and high-capacity wireless communication, recently, a single mobile communication terminal is capable of performing varied and multiple functions. For example, an entertainment function, such as a game, a multimedia function, such as reproducing music/video files, a communication and security function for mobile banking, etc., a scheduling function, an electronic wallet function, etc. are integrated into a single electronic device, in addition to a communication function.

Portable electronic devices including, for example, electronic diaries, portable multimedia players, mobile communication terminals, tablet PCs, etc. are generally equipped with flat panel display devices and batteries, and have a bar type, a folder type, or a slide type external appearance on account of the shapes of the display devices or the batteries. Recently, wearable electronic devices that can be worn on a part of a human body, such as the wrist or head, have emerged as displays and batteries have become more compact and have better performance. Furthermore, according to the preference of users who are concerned with the design of electronic devices, electronic devices having a case or a part thereof (e.g., the outer periphery thereof) made of a metal material and electronic devices having batteries embedded therein, instead of detachable batteries, have emerged.

These electronic devices may perform security functions, such as user authentication, etc., or may expand the storage capacities thereof by using storage mediums, such as Subscriber Identification Module (SIM) cards, memory cards, etc. The electronic devices may have sockets installed therein for receiving the storage mediums, and the storage mediums may be inserted into the electronic devices while being mounted on trays according to the structures of the electronic devices. These trays may also be formed of metal materials in order to harmonize with the design of the metal cases of the electronic devices.

Unless otherwise stated, nothing in the background section is to be construed as being prior art.

SUMMARY

An electronic device may have a metal case (or a part thereof), a tray on which a storage medium is mounted may also be formed of a metal material. In such cases where the storage medium is electrically connected to the metal tray, electrical signals (e.g., electrical signals according to reading/writing operations) applied to the storage medium may be induced or conducted to the metal tray or the metal case, and in cases where different connection pads of the storage medium short-circuit by the electrical signals induced to the tray or case, the storage medium may be damaged. Furthermore, a user that makes contact with the metal case (or a part thereof) is likely to be subjected to an electric shock due to the electrical signals induced to the metal case (or a part thereof).

In contrast, static electricity generated in the electrically conductive case or a part thereof, e.g., a metal case (or a part thereof), by the influence of an external environment (e.g., a user's contact) may be transmitted to the storage medium via the metal case to cause the storage medium to malfunction or become damaged.

Various embodiments of the present disclosure provide an electronic device that can shut off the electrical contact or connection between a metal tray and a storage medium, thereby preventing a user from being subjected to an electric shock and preventing the storage medium from malfunctioning or being damaged.

In addition, various embodiments of the present disclosure provide an electronic device that can alleviate the physical shock of connection terminals of a socket when a tray is inserted into and separated from the socket.

An electronic device, according to various embodiments of the present disclosure, may include: a socket; a tray detachably received in the socket; a receiving space formed in the tray; and a mounting section formed in the receiving space. The receiving space may be configured to receive a storage medium having one or more connection pads formed on a first side thereof, and the mounting section is configured disposed to face a second side of the storage medium when the storage medium is received with the receiving space, the first side being opposite to the second side. The storage medium may include at least one of a Subscriber Identification Module (SIM) card and a memory card. The at least one of the tray and the mounting section may be formed of a conductive material. The conductive material may be a metal. The socket may include one or more connection terminals configured to electrically contact with the connection pads, and the storage medium is receivable between the one or more connection terminals and the mounting section. A guide groove may be formed in the tray, and the one or more connection terminals move along the guide groove in the process in which the tray is received in the socket. One end of the tray may be inclined relative to an opposite end, and the one or more connection terminals slide toward the one side of the storage medium along the inclined end of the tray in the process in which the tray is received in the socket. The tray may be configured to be inserted into the socket in a first direction, and the mounting section extends in first direction in which the tray is inserted into the socket and supports opposing edges of the storage medium.

The electronic device, according to the various embodiments of the present disclosure, may prevent the connection pads of the storage medium from making contact with the tray or the mounting section to shut off electricity between the storage medium and the tray, thereby preventing the storage medium from being damaged. In addition, the electronic device may prevent a current, which may be applied in order to use the storage medium, from being transmitted to a user via the metal case or a part thereof and the metal tray, thereby preventing the user from being subjected to an electric shock.

These and other aspects of the present disclosure are more fully described hereinbelow.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION

Figure 1:
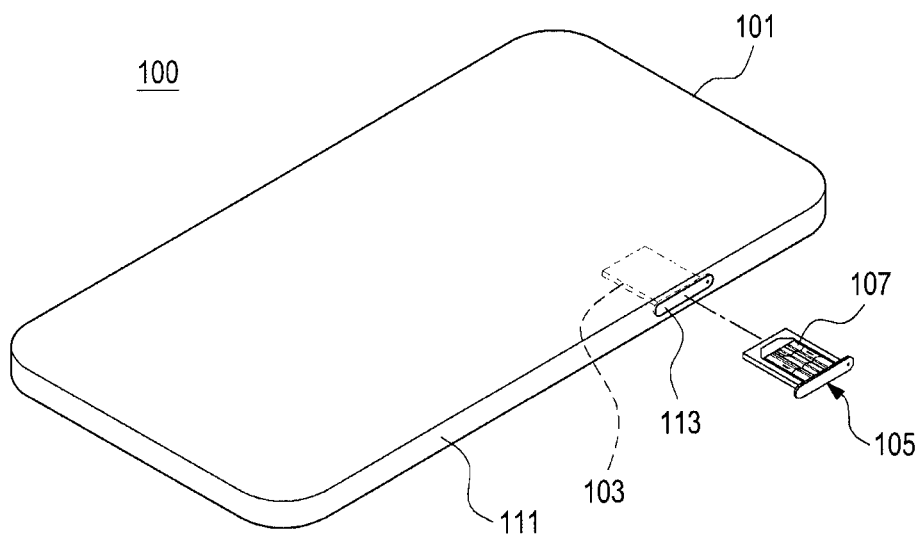
FIG. 1 is a perspective view of an electronic device according to an embodiment of the present disclosure.

Hereinafter, various embodiments of the present disclosure will be described with reference to the accompanying drawings. However, it should be understood that there is no intent to limit the present disclosure to the particular forms disclosed herein; rather, the present disclosure should be construed to cover various modifications, equivalents, and/ or alternatives of embodiments of the present disclosure. In describing the drawings, similar reference numerals may be used to designate similar constituent elements.

As used herein, the expression "have", "may have", "include", or "may include" refers to the existence of a corresponding feature (e.g., numeral, function, operation, or constituent element such as component), and does not exclude one or more additional features.

In the present disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including all of at least one A and at least one B.

The expression "a first", "a second", "the first", or "the second" used in various embodiments of the present disclosure may modify various components regardless of the order and/or the importance but does not limit the corresponding components. For example, a first user device and a second user device indicate different user devices although both of them are user devices. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposer between them. In contrast, it may be understood that when an element (e.g., first element) is referred to as being "directly connected," or "directly coupled" to another element (second element), there are no element (e.g., third element) interposed between them.

The expression "configured to" used in the present disclosure may be exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g. embedded processor) only for performing the corresponding operations or a generic-purpose processor (e.g., central processing unit (CPU) or application processor (AP)) that can perform the corresponding operations by executing one or more software programs stored in a memory device.

The terms used herein are merely for the purpose of describing particular embodiments and are not intended to limit the scope of other embodiments. As used herein, singular forms may include plural forms as well unless the context clearly indicates otherwise. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even the term defined in the present disclosure should not be interpreted to exclude embodiments of the present disclosure.

An electronic device, according to various embodiments of the present disclosure, may include a touch panel, and the electronic device may be referred to as a terminal, a portable terminal, a mobile terminal, a communication terminal, a portable communication terminal, a portable mobile terminal, a display device, etc.

For example, the electronic device may be a smartphone, a portable phone, a game player, a TV, a display unit, a heads-up display unit for a vehicle, a notebook computer, a laptop computer, a tablet Personal Computer (PC), a Personal Media Player (PMP), a Personal Digital Assistants (PDA), and the like. The electronic device may be implemented as a portable communication terminal which has a wireless communication function and a pocket size. Further, the electronic device may be a flexible device or a flexible display device.

The electronic device may communicate with an external electronic device, such as a server or the like, or perform an operation through an interworking with the external electronic device. For example, the electronic device may transmit an image photographed by a camera and/or position information detected by a sensor unit to the server through a network. The network may be a mobile or cellular communication network, a Local Area Network (LAN), a Wireless Local Area Network (WLAN), a Wide Area Network (WAN), an Internet, a Small Area Network (SAN) or the like, but is not limited thereto.

FIG. 1 is a perspective view of an electronic device according to one of the various embodiments of the present disclosure.

Referring to FIG. 1, the electronic device 100 according to the embodiment of the present disclosure may include a case 101, a socket 103, a tray 105, and a storage medium 107.

The case 101 may form the exterior of the electronic device 100, protect the interior of the electronic device 100, and have a window member (not illustrated) provided on the front side thereof through which a display of the electronic device may be viewable. For example, the window member may protect a display module installed inside the case 101 and may transmit a screen output through the display module. Various input/output devices, such as a keypad, a call receiving part, etc., and various sensors, such as an ambient light sensor, etc., may be disposed in the case 101.

The window member may be integrally formed with a touch panel to implement a virtual keypad, for example a touch screen, together with the display module. The case 101 may be formed of a metal material. Alternatively, a part 111 of the case 101 (for example, the outer periphery 111 of the case 101) may be formed of a metal material, and the rest of the case 101 may be formed of a synthetic resin. The metal case 101 or the part 111 thereof may be used as a radiator of an antenna of the electronic device 100. Further, a circuit board 131 (illustrated in FIG. 4) may be provided inside the case 101. The circuit board 131 (illustrated in FIG. 4) may be equipped with a controller, a storage unit, a communication circuit unit, etc. that are required to drive the electronic device 100 and may perform the function of the main circuit board.

The socket 103 may be connected to the circuit board 131 (illustrated in FIG. 4) provided inside the case 101. The socket 103 may establish a connection for the storage medium 107, for example, a memory card (a Secure Digital (SD) card, a micro SD card, etc.) or a Subscriber Identification Module (SIM) card.

The tray 105 may be detachably provided in the socket 103 while the storage medium 107 is received therein. The tray 105 may be at least partially formed of a metal material to have conductivity. A means or configuration for preventing a current from flowing across the metal case 101 (or the part 111 thereof) and the metal tray 107 will be described below with reference to the drawings.

Figure 2:
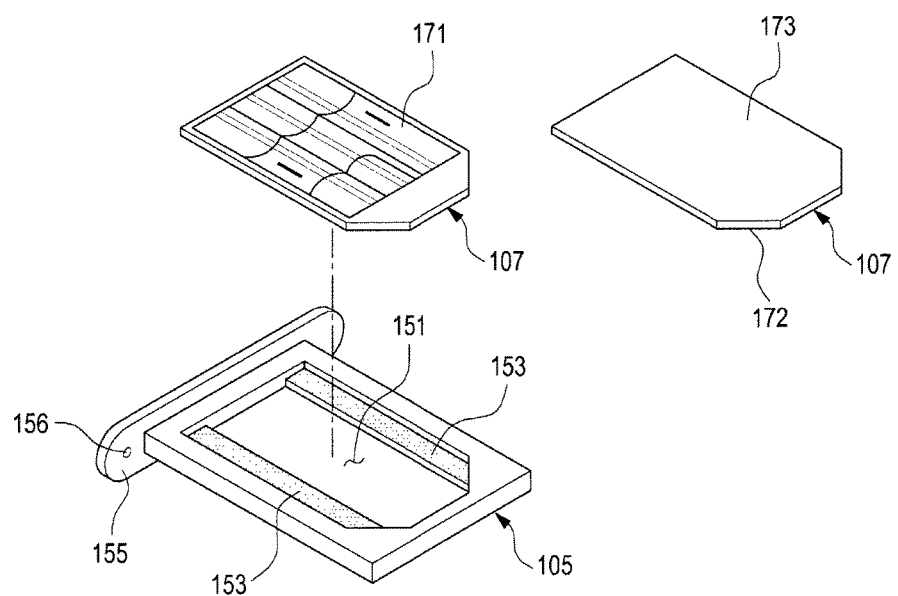
FIG. 2 is a perspective view illustrating a storage medium and a tray of the electronic device according to the embodiment of the present disclosure.
Figure 3:
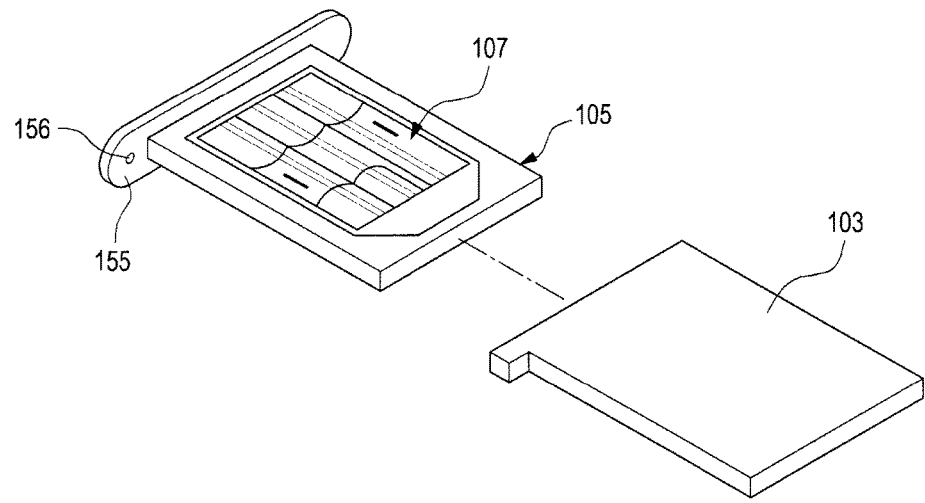
FIG. 3 is a perspective view illustrating a state in which the tray of the electronic device of FIG. 2 is mounted in a socket.

FIG. 2 is a perspective view illustrating the storage medium and the tray of the electronic device according to the embodiment of the present disclosure. FIG. 3 is a perspective view illustrating a state in which the tray of the electronic device, according to the embodiment of the present disclosure, is mounted in the socket. Here, one or more connection pads 171 that are electrically connected to connection terminals 133 of the socket 103 may be formed on a first side 172 of the storage medium 107. Further, a second side 173 being opposite to the a first side 172 of the storage medium 107 may be at least partially formed of a non-conductive material.

Referring to FIGS. 2 and 3, the electronic device 100, according to the embodiment of the present disclosure, may include a receiving space 151 formed in the tray 105 and mounting sections 153 formed in the receiving space 151.

The tray 105 may have the receiving space 151 that is open in the up/down direction such that a space is formed within the receiving space 151 corresponding to the storage medium 107. The receiving space 151 may have a size corresponding to the storage medium 107 in order for the storage medium 107 to be received therein. The tray 105 may be inserted into the socket 103 in one direction, and the mounting sections 153 may form a part of the lower side of the tray 105 in the receiving space 151. The mounting sections 153 may extend in the direction in which the tray 105 is inserted and may be positioned to face opposite edges of the storage medium 107. For example, the mounting sections 153 may be positioned on the lower side of the tray 105 to close a portion of the receiving space 151 in order to support the storage medium 107 received in the receiving space 151. For instance, the storage medium 107 may be received in the receiving space 151 while being supported on the mounting sections 153. The mounting sections 153 face the non-conductive portion on the second side 173 (FIG. 2) of the storage medium 107 so that the connection pads 171 of the storage medium 107 may be flush with the upper end of the tray 105. Namely, the connection pads 171 may be maintained to be separated from the mounting sections 153 so that it is possible to prevent an electrical connection from being established between the connection pads 171 and the metal tray 105.

Further, the tray 105 may include a handle 155 that a user can grip with his/her hand or a tool. The handle 156 may have a first hole 156 formed therein into which a pin (not illustrated) for releasing the coupling of the tray 105 and the socket 103 is inserted. The socket 103 may have a second hole (not illustrated) formed therein to correspond to the first hole 156. In cases where the tray 105 has been received in the socket 103, the pin may be inserted into the first hole 156 and the second hole so that the tray 105 can be separated from the socket 103 and exposed to the outside of the electronic device 100 (illustrated in FIG. 1).

In the specific embodiment of the present disclosure, the mounting sections 153 are illustrated as being formed and arranged to face a portion of the second side 173 of the storage medium 107. For example, the receiving space 151 is illustrated as being formed through the upper and lower sides of the tray 105. However, the present disclosure does not have to be limited thereto. For example, the mounting sections 153 may be positioned on the lower side of the tray 105 to close the entire space bounded by the receiving space 151 so that the receiving space 151 may be implemented as a recess formed on the upper side of the tray 105.

Figure 4:
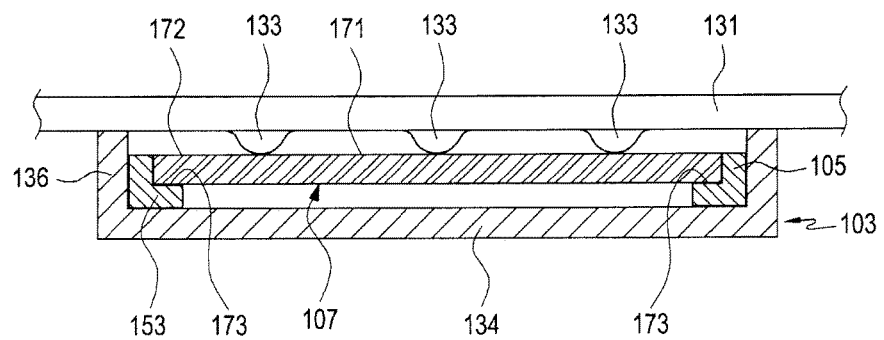
FIG. 4 is a sectional view illustrating the tray of the electronic device, according to the embodiment of the present disclosure, mounted in the socket.

FIG. 4 is a sectional view illustrating the tray of the electronic device, according to the embodiment of the present disclosure, mounted in the socket.

Referring to FIG. 4, the socket 103 employed for the electronic device 100, according to the embodiment of the present disclosure, may include a bottom part 134 facing the lower sides of the mounting sections 153 and side parts 136 extending from opposite sides of the bottom part 134. The socket 103, including the bottom part 134 and the side parts 136, may receive the tray 105 therein while facing the lower side and the opposite lateral sides of the tray 105.

Further, the circuit board 131 may be provided on the upper side of the socket 103. Here, the circuit board 131 may be the main circuit board of the electronic device 100 or an auxiliary circuit board connected to the main circuit board. The circuit board 131 may be electrically connected to the connection terminals 133 that make electrical contact with the connection pads 171. The connection terminals 133 may protrude from one surface of the circuit board 131 and may have resilience. For example, the connection terminals 133 may have a structure capable of accumulating a resilient force, such as a C-clip, so that the connection terminals may consistently make stable contact with the connection pads 171.

As described above, the connection pads 171 of the storage medium 107 may be maintained to be spaced apart from the metal part (for example, the tray 105 or the mounting sections 153) while making contact with the connection terminals 133 so that the electronic device 100, according to the embodiment of the present disclosure, may prevent a current from being transmitted to the tray 105 via the connection pads 171. Further, the electronic device 100 may shut off the electrical contact between the connection pads 171 and the tray 105, thereby preventing the damage or malfunction of the storage medium 107.

In addition, the connection pads 171 may be spaced apart from the tray 105 so that a current flow between the connection pads 171 and the metal parts, such as the case, etc., can be shut off, thereby preventing static electricity caused by a user's touch on the metal case (or a part thereof) from being induced to the storage medium 107, for example, the connection pads 171. For example, it is possible to prevent or inhibit the storage medium 107 from being damaged by static electricity generated in an external environment.

Figure 5:
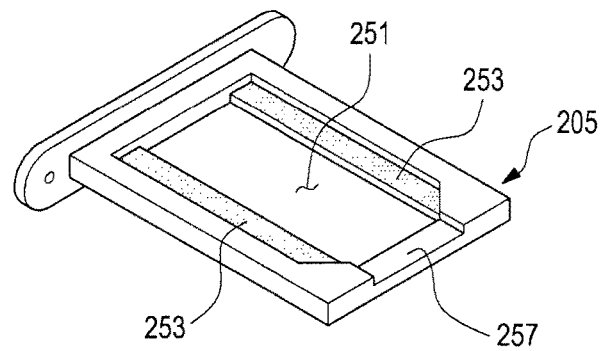
FIG. 5 is a perspective view illustrating a modified example of the tray of the electronic device according to various embodiments of the present disclosure.
Figure 6:
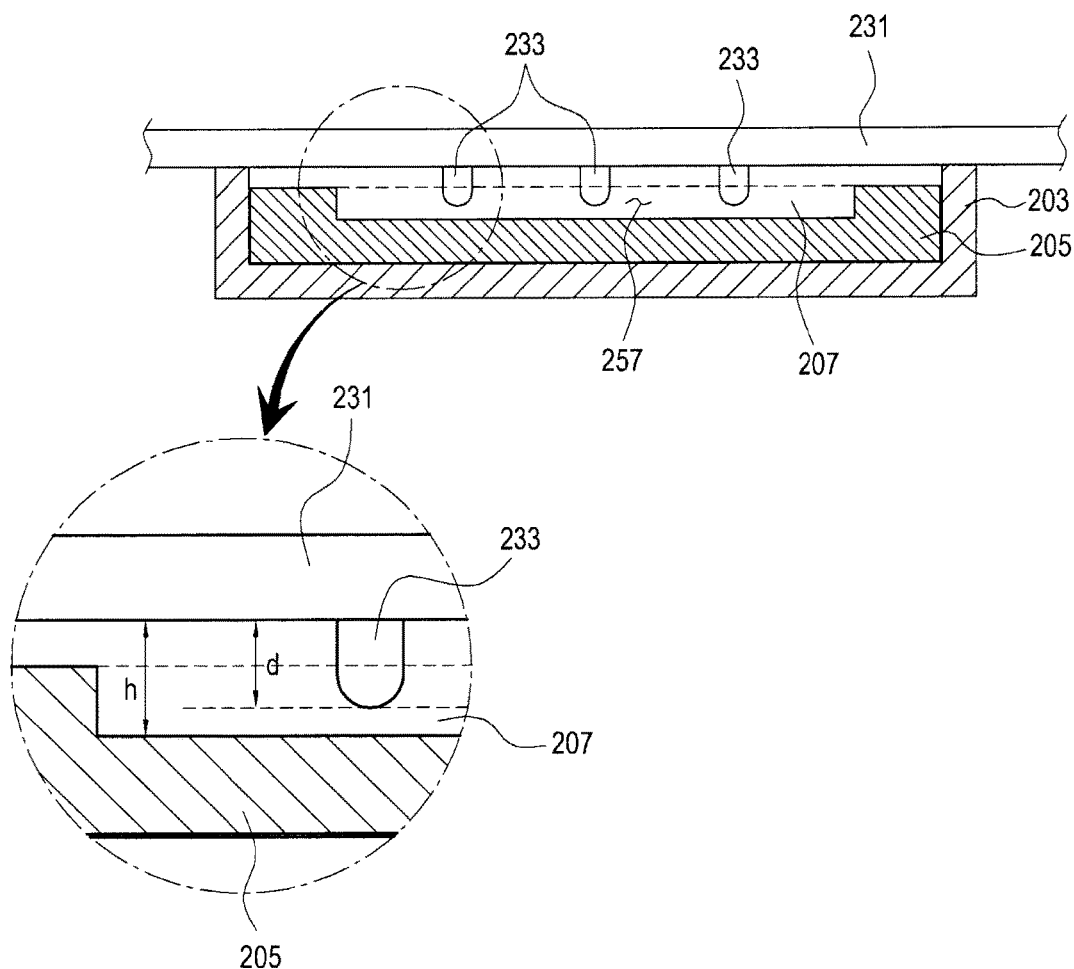
FIG. 6 is a sectional view illustrating the tray, illustrated in FIG. 5, mounted in a socket.

FIG. 5 is a perspective view illustrating a modified example of the tray of the electronic device according to various embodiments of the present disclosure. FIG. 6 is a sectional view illustrating the tray, illustrated in FIG. 5, mounted in a socket.

Referring to FIGS. 5 and 6, the electronic device, according to the various embodiments of the present disclosure, may include a circuit board 231, a socket 203, a tray 205, a receiving space 251, mounting sections 253, and/or a guide groove 257 formed in the tray 205. The storage medium 207 may be received in the socket 203 while being accommodated in the tray 205. According to various embodiments, the socket 203 may be mounted on the circuit board 231 (e.g., the main circuit board of the electronic device), and connection terminals 233 may be mounted on the main circuit board and may extend toward the inside of the socket 203.

The guide groove 257 may be formed in one end of the tray 205 directed toward the socket 203. The depth of the guide groove 257 may be greater than the length of the connection terminals 233. For example, the guide groove 257 may be formed such that the distance (h) from the circuit board 231 to the bottom of the guide groove 257 is greater than the length (d) of the connection terminals 233, whereby the connection terminals 233 may be maintained to be spaced apart from the tray 205 in the process in which the tray 205 is inserted into the socket 203. Accordingly, even though the tray 205 is repeatedly inserted into and separated from the socket 203, it is possible to alleviate the physical deformation of the connection terminals 233 due to interference with the tray 205.

Figure 7:
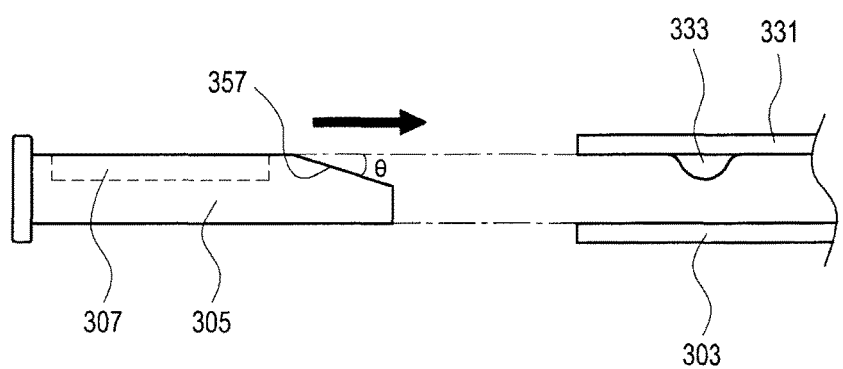
FIG. 7 is a side view illustrating another modified example of the tray of the electronic device according to various embodiments of the present disclosure.

FIG. 7 is a side view illustrating another modified example of the tray of the electronic device according to various embodiments of the present disclosure.

Referring to FIG. 7, the electronic device, according to the various embodiments of the present disclosure, may include a circuit board 331, connection terminals 333, a socket 303, and/or a tray 305 for receiving a storage medium 307.

One end 357 of the tray 305 may be formed to be inclined. For example, the end 357 of the tray 305 may have a slope (θ) of an acute angle with respect to the upper end of the tray 305. The slope (θ) may be proportional to the length of the connection terminals 333. The connection terminals 333 may slide toward one side (e.g., connection pads) of the storage medium 307 while making sliding contact with the inclined end 357 of the tray 305 in the process in which the tray 305 is received in the socket 303. Accordingly, the inclined end 357 of the tray 305 may alleviate the physical collision with connection terminals 333 in the process in which the tray 305 is received in the socket 303.

As described above, an electronic device, according to various embodiments of the present disclosure, may include: a socket; a tray detachably provided in the socket; a receiving space formed in the tray; and a mounting section formed in the receiving space, wherein the receiving space may be formed to receive a storage medium having one or more connection pads formed on one side thereof, and the mounting section may be disposed to face the opposite side of the storage medium.

According to various embodiments of the present disclosure, the storage medium may be a Subscriber Identification Module (SIM) card or a memory card.

According to various embodiments of the present disclosure, the tray or the mounting section may be formed of a metal material.

According to various embodiments of the present disclosure, the socket may include connection terminals that make electrical contact with the connection pads, and the storage medium may be received between the connection terminals and the mounting section.

According to various embodiments of the present disclosure, the electronic device may further include a guide groove formed in the tray, wherein the connection terminals may move along the guide groove in the process in which the tray is received in the socket.

According to various embodiments of the present disclosure, one end of the tray may be formed to be inclined, and the connection terminals may slide toward the one side of the storage medium along the inclined end of the tray in the process in which the tray is received in the socket.

According to various embodiments of the present disclosure, the tray may be inserted into the socket in one direction, and the mounting section may extend in the direction in which the tray is inserted into the socket and may face opposite edges of the storage medium.

While the present disclosure has been shown and described with reference to certain embodiments thereof, it will be understood by those skilled in the art that various changes in form and details may be made therein without departing from the spirit and scope of the present disclosure as defined by the appended claims.

What is claimed is:
1. An electronic device comprising:
   a socket;
   a tray detachably received in the socket;
   a receiving space formed in the tray; and
   a mounting section formed in the receiving space,
   wherein the receiving space is configured to receive a storage medium having one or more connection pads formed on a first side thereof, and the mounting section is configured disposed to face a second side of the storage medium when the storage medium is received with the receiving space, the first side being opposite to the second side, and
   wherein the socket comprises one or more connection terminals configured to electrically contact with the connection pads, and the one or more connection terminals is not disposed in a opening of the mounting section, wherein one end of the tray is inclined relative to an opposite end, and the one or more connection terminals slide toward the one side of the storage medium along the inclined end of the tray in the process in which the tray is received in the socket, wherein the mounting sections is positioned on the lower side of the tray to close a portion of the receiving space.

2. The electronic device of claim 1, wherein the storage medium includes at least one of a Subscriber Identification Module (SIM) card and a memory card.

3. The electronic device of claim 1, wherein at least one of the tray and the mounting section is formed of a conductive material.

4. The electronic device of claim 3, wherein the conductive material is a metal.

5. The electronic device of claim 1, wherein the storage medium is receivable between the one or more connection terminals and the mounting section.

6. The electronic device of claim 5, further comprising:
a guide groove formed in the tray,
wherein the one or more connection terminals move along the guide groove in the process in which the tray is received in the socket.

7. The electronic device of claim 1, wherein the tray is configured to be inserted into the socket in a first direction, and the mounting section extends in first direction in which the tray is inserted into the socket and supports opposing edges of the storage medium.

* * * * *